Oct. 10, 1961   H. E. BIRABEN   3,003,608
MANUALLY ENGAGEABLE AND FLUID RELEASE CENTRIFUGAL CLUTCH
Filed Sept. 26, 1958   6 Sheets-Sheet 1

Inventor
Henri E. Biraben
By W. C. Middleton
Attorney

United States Patent Office 3,003,608
Patented Oct. 10, 1961

3,003,608
MANUALLY ENGAGEABLE AND FLUID RELEASE CENTRIFUGAL CLUTCH
Henri E. Biraben, Harpenden, England, assignor to General Motors Corporation, Detroit, Mich., a corporation of Delaware
Filed Sept. 26, 1958, Ser. No. 763,695
11 Claims. (Cl. 192—83)

This invention relates to centrifugal clutches and more particularly to centrifugal clutches adapted to be disengaged at rest and to be gradually engaged by centrifugal weights above a predetermined speed, and comprising a vacuum-operated servomotor including a piston rod forming part of a linkage by which a piston or diaphragm of the servomotor is connected to a clutch disengagement device, the servomotor being adapted to be connected to a source of vacuum to disengage the clutch at will and automatically at speeds below a speed lower than the predetermined speed.

In order to permit engagement of the clutch at rest to obtain engine braking with a gear engaged, there is an over-ride device for the centrifugal weights which permits engagement of the clutch at rest upon movement of the linkage beyond the normal disengagement position obtainable by operation of the servomotor. If the source of vacuum is available subsequent to operation of the over-ride device and engagement of the clutch, the servomotor would be operated to disengage the clutch because the speed is below the lower speed.

To avoid this, according to the invention, the over-ride device has a manual actuator means which, upon operation, opens a normally closed relief valve to connect the source of vacuum or the vacuum chamber of the servomotor to atmosphere.

Preferably, the manual actuator means includes a flexible Bowden cable, one of whose members is movable and the other of which is relatively fixed at one end and is secured at the other end to a movable valve member of the relief valve.

Alternatively, the servomotor piston rod may be in the form of a tube which connects the vacuum chamber of the servomotor to atmosphere and contains a valve seat upon which seats a valve member on the adjacent portion of the linkage. In this case, the valve member is normally held on the valve seat to close the vacuum chamber from atmosphere by tension in the linkage, but movement of the linkage beyond the normal disengagement position lifts the valve member off the valve seat to relieve vacuum in the servomotor and in the source of vacuum.

The scope of the invention is defined by the appended claims; and how it can be carried into effect is hereinafter particularly described with reference to the accompanying drawings, in which:

Figures 5, 6:
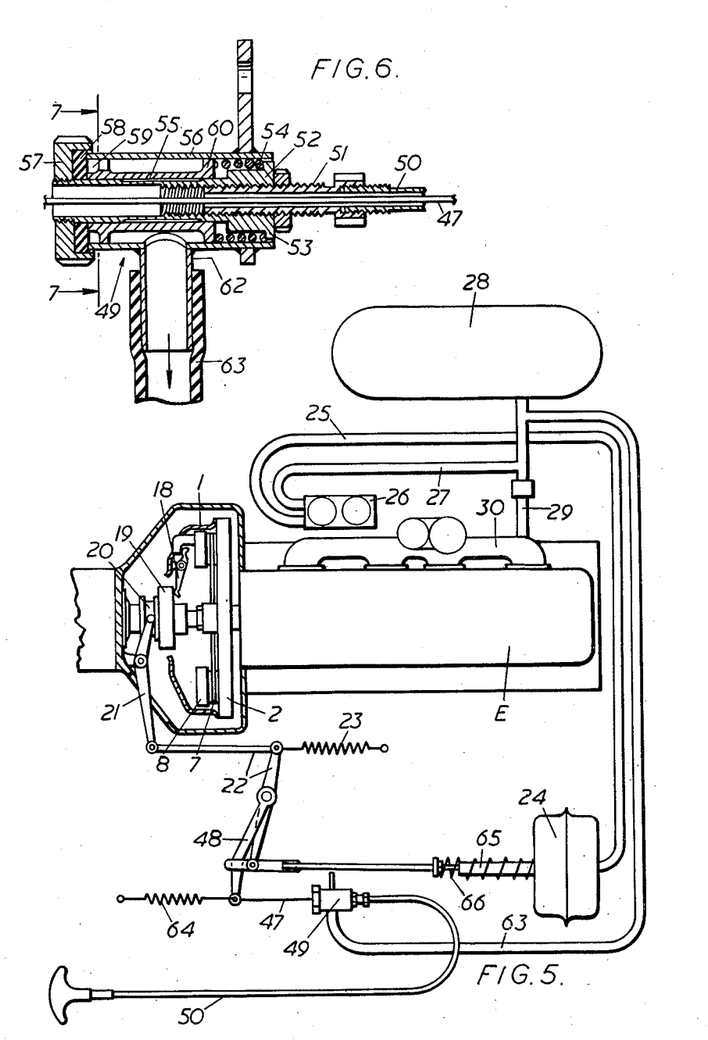
FIGURE 5 is a schematic drawing of the clutch and one embodiment of operating mechanism.
FIGURE 6 is a section of a relief valve forming part of the operating mechanism shown in FIGURE 5.
Figure 9:
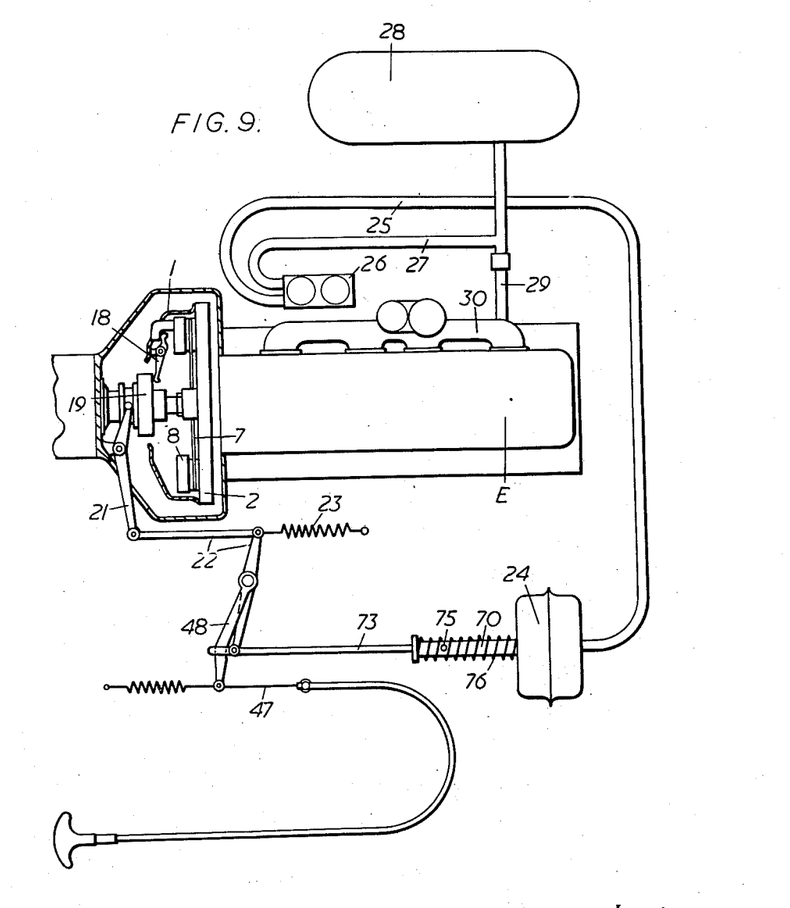
FIGURE 9 is a schematic drawing of the clutch and another embodiment of operating mechanism.

The centrifugal clutch comprises an annular casing 1 secured to the flywheel 2 of an engine E (FIGURES 5 and 9). On a rearward portion of the casing 1 (FIGURE 1) are pivoted three bell crank levers 3 each of which has an inner arm 4 and an outer arm 5 and a weight 6 on the outer arm 5. Within the casing 1 is disposed a clutch plate 7, an annular clutch pressure plate 8 and a clutch spring ring 9. Six coil springs 10 are located between the pressure plate 8 and spring caps 11 secured to the clutch spring ring 9. The ends of the inner arms 4 of the pivoted bell crank levers 3 engage the rear faces of brackets 12 on the back of the clutch spring ring 9. Between each bracket 12 and the pivot of the associated lever 3, a pillar 13 projects from the pressure plate 8 through a hole 14 in the inner arm 4.

Figures 1, 2, 3:
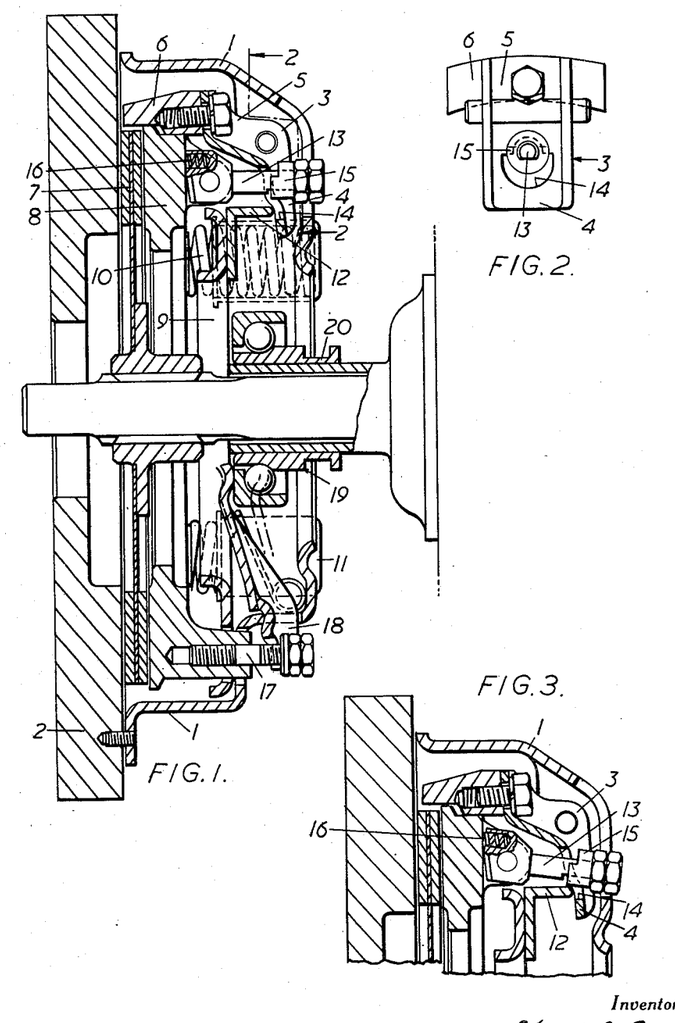
FIGURE 1 is a section of a centrifugal clutch to which the present invention relates.
FIGURE 2 is a view of part of the clutch in the direction of the arrows 2—2 of FIGURE 1.
FIGURE 3 is a view of portion of FIGURE 1 with the parts in a different position.

Each pillar 13 is pivoted to the back of the pressure plate 8 and has an adjustable stop 15 to engage the opposite side of the inner arm 4 of the lever 3 to the adjacent bracket 12 on the clutch spring ring 9. Each pillar 13 is urged by a light spring 16 about its pivot on the pressure plate 8 towards a position in which its stop 15 is aligned with the clearance hole 14 in the inner arm 4 of the lever 3 (FIGURE 3). Each pillar 13 is held with its stop 15 in contact with the back of the inner arm 4 of the lever 3 (FIGURE 2) by the pressure of the clutch spring ring 9 upon the outer end of the inner arm 4. The light springs 16 are located between the pressure plate 8 and the pillars 13 radially outwardly of the pivots so that the stops 15 of the pillars 13 are urged radially inwardly. Upon rotation of the pressure plate 8, centrifugal force tends to throw the stops 15 of the pillars 13 outwardly and thus to engage or maintain them in contact with the inner arms 4.

Projecting from the back of the pressure plate 8 are three fixed bolts 17 whose heads are engaged by clutch throw out levers 18. The levers 18 project radially inwardly from the bolts 17, are pivoted on the casing 1 and are engaged by a clutch withdrawal bearing 19. The clutch withdrawal bearing 19 has an annular groove 20 in which a pivoted fork 21 (FIGURES 5 and 9) is engaged and the free end of the pivoted fork 21 is connected to a clutch disengagement linkage 22 normally spring urged to the clutch engaged position by a light spring 23.

Figure 4:
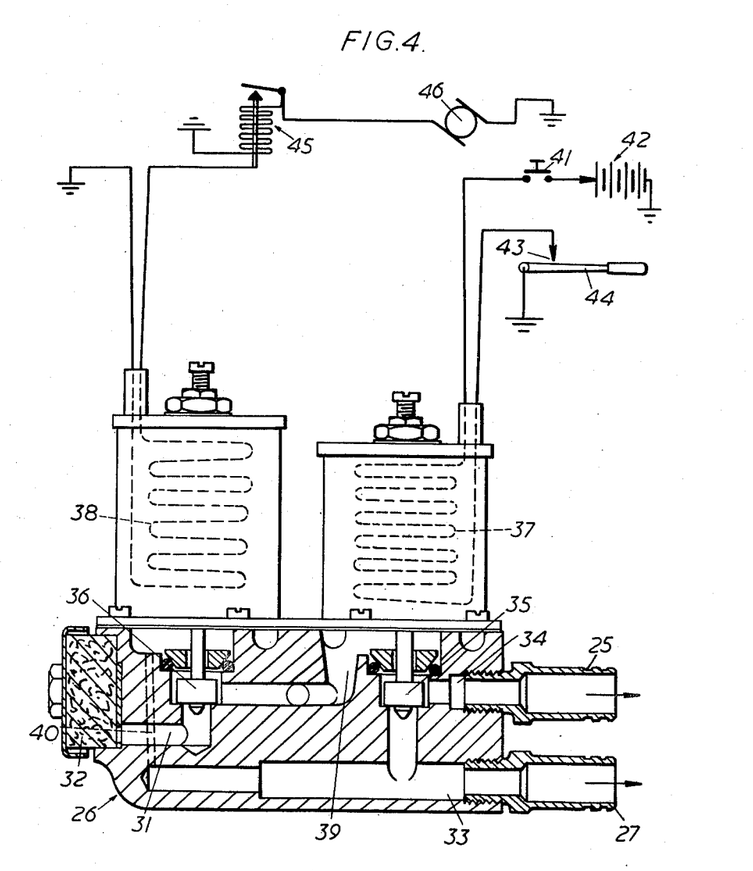
FIGURE 4 is a diagrammatic view of a control valve operating circuit and a section of a control valve forming part of the operating mechanism of the clutch.
Figure 8:
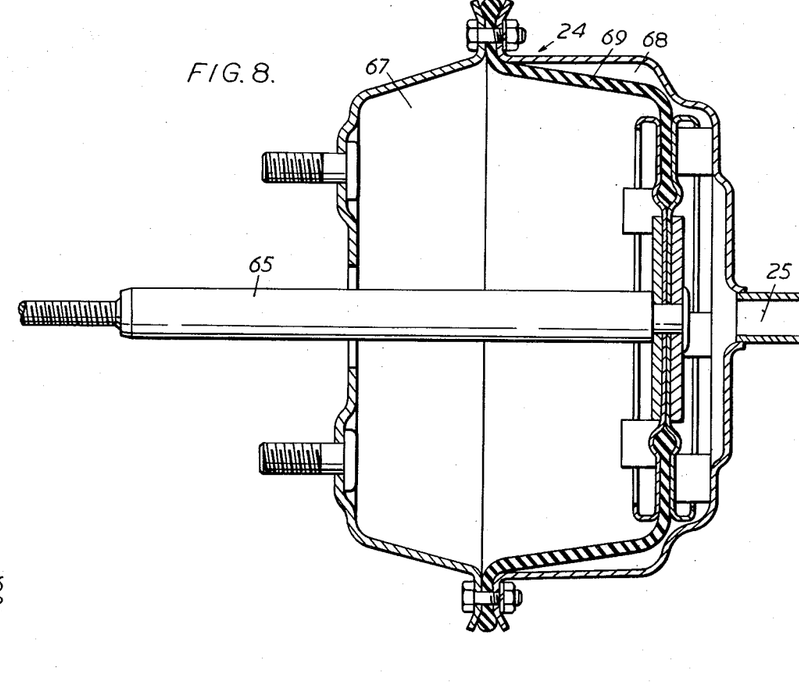
FIGURE 8 is a section of a servomotor forming part of the operating mechanism shown in FIGURE 5.

The clutch disengagement linkage 22 (FIGURES 5 and 9) is connected to a piston rod of a diaphragm servomotor 24 (FIGURES 8 and 10) which has two chambers 67 and 68 separated by a diaphragm 69 to which the piston rod is attached. The one chamber 67 is connected to atmosphere and the other chamber 68 is connected through a conduit 25, a control valve 26 and a conduit 27 to a vacuum reservoir tank 28 connected by a conduit 29 to the engine intake manifold 30. The control valve 26 (FIGURE 4) comprises an air intake 31 with a filter 32, a vacuum inlet passage 33 connected to the conduit 27 from the vacuum reservoir tank 28 and an outlet passage 34 connected to the conduit 25 from the servomotor 24. The control valve 26 includes two valve members 35 and 36 operated by solenoids 37 and 38, respectively. With the first solenoid 37 de-energized, its valve member 35 is in a position to connect the outlet passage 34 to a central chamber 39, as shown in FIGURE 4. With the first solenoid 37 energized, the valve member 35 connects the outlet passage 34 to the vacuum inlet passage 33. With the second solenoid 38 de-energized, its valve member 36 connects the central chamber 39 through a bleed passage 40 to the vacuum inlet passage 33. With the second solenoid 38 energized, the valve member 36 connects the central chamber 39 to the air intake 31.

One terminal of the first solenoid 37 is connected through the ignition switch 41 to one side of the vehicle battery 42, whose other side is connected through earth and a switch 43 in the gear shift lever 44 to the other terminal of the solenoid 37. One terminal of the second solenoid 38 is connected through a voltage-sensitive relay 45 to one side of the dynamo 46 whose other side is connected through earth to the other terminal of the second solenoid 38.

In operation, the engine E is started and drives the clutch casing 1 through the flywheel 2. Vacuum is built up in the vacuum reservoir tank 28 and as the engine idles, the dynamo 46 does not produce sufficient voltage to operate the voltage sensitive relay 45 so that the second solenoid 38 remains de-energized. Thus the clutch disengagement servomotor 24 is connected through the central chamber 39 and the bleed passage 40 to the vacuum reservoir tank 28. Vacuum is applied to the servomotor 24 so that the clutch withdrawal bearing 19 is moved through the clutch disengagement linkage 22 to hold the clutch withdrawn by the vacuum servomotor.

In order to move off, the gear shift lever 44 is moved to engage the appropriate gear and the gear shift lever switch 43 is closed. The consequent energization of the first solenoid 37 of the control valve 26 has no effect as the servomotor 24 is already connected to the vacuum reservoir tank 28. The speed of the engine E is then increased until the voltage sensitive relay 45 operates to energize the second solenoid 38. The central chamber 39 is then connected to the air intake 31 which breaks the vacuum in the servomotor 24 which returns to the clutch engagement position moving the clutch withdrawal bearing 19 by means of the clutch disengagement linkage 22. The clutch remains disengaged, however, by the pivoted levers 3.

Subsequently, the weights 6 on the pivoted levers 3 fly outwards and the inner arms 4 move the clutch spring ring 9 towards the pressure plate 8 which is moved towards the clutch plate 7 by the six clutch springs 10. The pivoted levers 3 continue to move until the clutch is fully engaged and the vehicle moves off smoothly.

Subsequent gear shifts are effected by moving the gear shift lever 44, movement of which causes closure of the switch 43 and energization of the first solenoid 37 which operates the vacuum servomotor 24 to disengage the clutch. Release of the gear shift lever 44 in the selected position opens the switch 43 to de-energize the first solenoid 37, whereupon the vacuum servomotor 24 returns to the clutch engagement position.

When the car is at rest with the engine stationary, it is desirable, and in some cases necessary, to be able to engage the clutch which is otherwise held disengaged by the six springs 10 which press the inner arms 4 of the pivoted levers 3 so that the outer arms 5 and weights 6 move radially inwards. This holds the pressure plate 8 away from the clutch plate 7 as the stops 15 on the pillars 13 engage the opposite sides of the inner arms 4. Engagement of the clutch is achieved by moving the clutch withdrawal bearing 20 beyond the normal clutch disengagement position thus moving the pressure plate 8 towards the clutch spring ring 9 and relieving pressure on the stops 15 of the pillars 13. Movement of the clutch withdrawal bearing 20 is effected manually by the inner cable 47 of a flexible Bowden cable secured to a pivoted lever 48 acting on the disengagement linkage 22 through a lost motion connection (FIGURES 5 and 9). The pillar springs 16 act to pivot the pillars 13 so that the stops 15 move radially inwards and upon release of the clutch withdrawal bearing 20, the pressure plate 8 is moved by the clutch springs 10 into engagement with the clutch plate 7, the stops 15 of the pillars 13 passing through the clearance holes 14 in the inner arms 4 of the pivoted levers 3. This movement necessitates movement of the clutch withdrawal bearing 20 to the clutch engagement position and equivalent movement of the clutch disengagement linkage 22. If vacuum exists in the vacuum servomotor 24, due to the de-energization of the second solenoid 38 as the speed of the engine decreases, it is not possible to engage the clutch until the vacuum has been broken. In addition, it is necessary to destroy the vacuum in the vacuum reservoir tank 28 which would otherwise act through the bleed passage 40 to operate the clutch servomotor 24 even though the vacuum in the latter had been broken.

Accordingly, in the embodiment illustrated in FIGURES 5 to 8, the flexible Bowden cable is connected to open a relief valve 49 for the vacuum reservoir tank 28 prior to movement of the clutch disengagement linkage 22 to move the clutch withdrawal bearing 20 beyond the normal clutch disengagement position. To achieve this, use is made of the characteristic of Bowden cable which produces opposite reaction movement of the conduit 50 upon movement of the inner cable 47, assuming only one end of the conduit 50 to be fixed.

Figure 7:
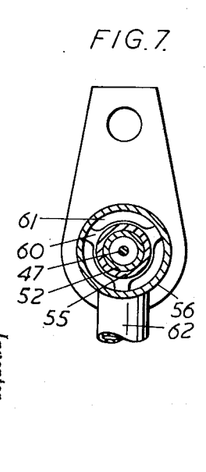
FIGURE 7 is a section on the line 7—7 of FIGURE 6.

The conduit 50 (FIGURE 6) is secured by an adjustable screw member 51 to a hollow relief valve plunger 52 through which the inner cable 47 extends. The plunger 52 has a shoulder 53 at one end to form an abutment seat for a spring 54 and is slidable in a tubular valve core 55 mounted in and spaced from a tubular relief valve housing 56. At the other end, the plunger 52 carries a valve head 57 containing an annular valve seat 58 to close one end of the annular space 59 between the core 55 and housing 56. The other end of the annular space 59 is closed by an annular core support 60. The core support 60 is a radial flange at one end of the core 55 and at the other end the core is supported by three legs 61 which do not block the space 59 (FIGURE 7). A tube 62 leading into the side of the housing 56 to communicate with the annular space 59 is connected by a pipe 63 to the vacuum reservoir tank 28. The compression spring 54 lies between the core support 60 and the plunger shoulder 52 and holds the valve 49 closed and is stronger than a return spring 64 which retains the cable 47 in its extended position, but the load of the relief valve spring 54 is less than that required to move the clutch withdrawal bearing 19 beyond the clutch disengaged position.

As soon as the inner cable 47 of the flexible Bowden cable is pulled to operate the linkage 22 to move the clutch withdrawal bearing 19 beyond the clutch disengagement position, reaction on the conduit 50 moves the valve plunger 52 so that the valve head 57 and seat 58 are lifted off the end of the valve housing 56 and the vacuum in the vacuum reservoir tank 28 is broken. The vacuum in the servomotor 24 is also broken through the bleed passage 40. The pressure on the clutch withdrawal bearing 19 provided by the vacuum servomotor 24 is therefore removed and the clutch is capable of being engaged by the clutch spring 10 as explained above. As the load of the relief valve spring 54 is less than the withdrawal load, the vacuum is broken first. This ensures that the movement of the clutch disengagement linkage 22 takes place after the vacuum is broken so that there is little or no resistance due to vacuum in the servomotor 24.

The piston rod 65 is urged to the clutch engagement position by a light coil spring 66. The valve head 57 and seat 58 remain off the end of the valve housing 56 so long as the cable 47 remains pulled. The cable is held pulled for a few seconds to ensure complete destruction of the vacuum in the servomotor 24 as well as in the reservoir tank 28. With the clutch engaged, the vehicle stationary and a gear engaged, engine braking is provided to prevent movement of the vehicle, for example on a hill. In addition it is possible to start the engine E by towing or pushing the vehicle.

As will be understood the space 59 in the relief valve housing 56 may be connected to the vacuum chamber 68 of the servomotor 24 by the pipe 63 rather than to the reservoir tank 28, but in this case, the tank 28 must be relieved through the bleed passage 40.

Figures 10, 11:
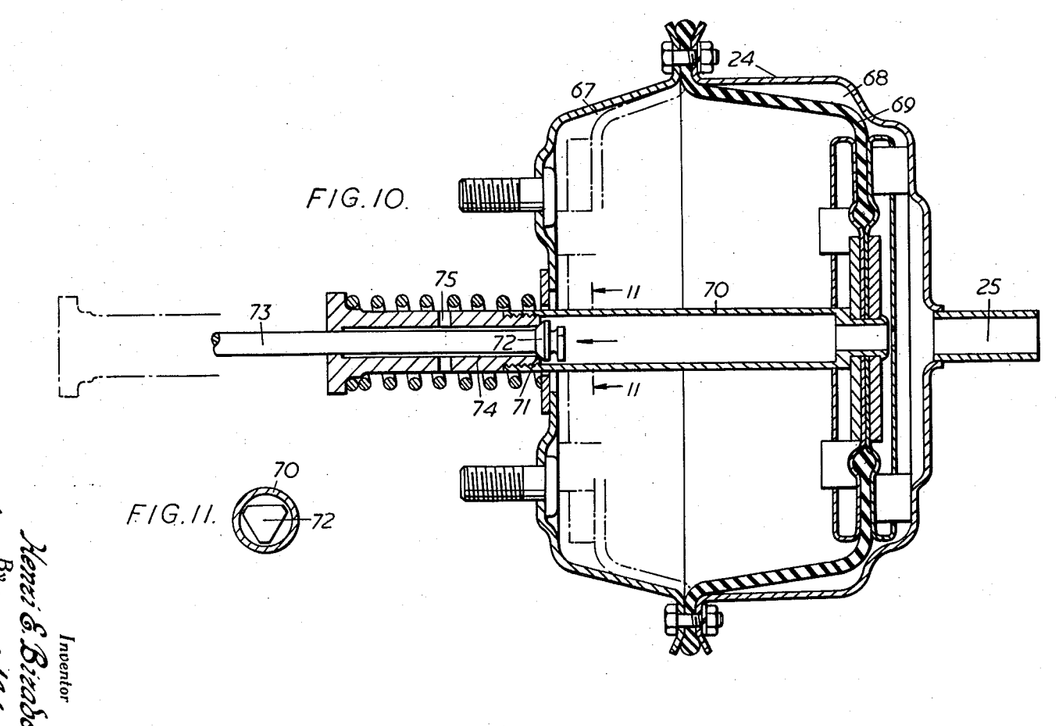
FIGURE 10 is a section of a servomotor forming part of the operating mechanism shown in FIGURE 9.
FIGURE 11 is a section on the line 11—11 of FIGURE 10.

In the embodiment illustrated in FIGURES 9 to 11, the piston rod of the vacuum servomotor 24 is made in the form of a tube 70 which connects the vacuum chamber 68 of the servomotor 24 through the diaphragm 69 to atmosphere and contains a valve seat 71 upon which seats a valve member 72 on a rod 73 connected to the clutch disengagement linkage 22. The valve seat 71 surrounds one end of a passage 74 surrounding the rod 73 and leading to atmosphere through a radial passage 75 in the tube 70. The valve member 72 connected to the linkage 22 is normally held on its seat 71 to prevent breakage of the vacuum in the servomotor 24 by the tension in the linkage 22 which is provided in the engaged position by the light spring 23 and additionally in the disengaged position by the six clutch springs 10. As soon as the cable 47 is moved to operate the linkage 22 to move the clutch withdrawal bearing 19 beyond the clutch disengagement position, the valve member 72 on the rod 73 is lifted off its seat 71 and the vacuum in the vacuum servomotor 24 is broken. The pressure on the clutch withdrawal bearing 19 provided by the vacuum servomotor is therefore removed and the clutch is capable of being engaged by the clutch springs 10 as explained above. The tubular piston rod 70 is urged to the clutch engagement position by a light coil spring 76 so that the valve member 72 remains off its seat 71 so long as the cable 47 remains operated. The cable is held for a few seconds to ensure complete destruction of the vacuum in the vacuum in the reservoir tank 28 as well as in the servomotor 24 so that the servomotor is not operated again when the cable 47 is released and the valve member 72 on the rod 73 re-seated on the seat 71 in the piston rod 70. With the clutch engaged, the vehicle stationary and a gear engaged, engine braking is provided to prevent movement of the vehicle, for example on a hill. In addition it is possible to start the engine by towing or pushing the vehicle.

What is claimed is as follows:

1. A clutch control mechanism for a centrifugally actuated clutch adapted to be disengaged at rest comprising in combination centrifugal weights for engaging said clutch when said weights are rotated above a predetermined speed, a clutch plate, a pressure plate, a spring ring, a spring disposed between said pressure plate and spring ring normally biasing said pressure plate towards its clutch engaging position, a stop member carried by said pressure plate and cooperating with said centrifugal weights to prevent engagement of said clutch plate by said spring when said pressure plate is at rest, a vacuum responsive servo motor, linkage connecting said servo motor to said pressure plate, a vacuum source, valve means for admitting vacuum to said servo motor, said servo motor being effective upon admission of vacuum thereto to move said linkage through a limited range of motion to release said pressure plate from said clutch plate without releasing said stop member from said centrifugal weights, a normally closed relief valve effective when open to connect said servo motor to atmosphere, and an additional manually operable overcontrol connected to said linkage, said overcontrol being effective when actuated to open said relief valve and to move said pressure plate beyond the normal range of travel obtainable through operation of said servo motor to release said stop member from said centrifugal weights, said spring being effective upon release of said stop member to engage said pressure plate to said clutch plate when said clutch plate is at rest.

2. A clutch control mechanism for a centrifugally actuated clutch adapted to be normally disengaged at rest and to be engaged by centrifugal weights when said weights are rotated at a speed above a predetermined speed comprising in combination, a clutch disengagement device, a vacuum operated servo-motor having a piston rod extending therefrom, a linkage mechanism operatively connected to said clutch disengaging device and to said piston rod, said servo motor being effective upon admission of vacuum thereto, to move said piston rod and linkage through a normal range of movement to disengage said clutch, a source of vacuum, valve means for controlling the admission of vacuum to said servo motor, speed responsive means for controlling said valve means to connect said servo motor to said vacuum source to disconnect said clutch at speeds below a predetermined speed, a manually operable actuator operatively connected to said clutch disengaging device and to a normally closed relief valve, said actuator being effective when actuated to first open said relief valve to connect said source of vacuum to the atmosphere and to subsequently move said linkage beyond the normal clutch disengagement position obtainable by operation of said servo-motor to permit engagement of said clutch when said clutch is at rest.

3. A clutch control mechanism for a centrifugally actuated clutch adapted to be disengaged at rest and to be engaged by centrifugal weights when said weights are rotated above a predetermined speed comprising in combination, a clutch disengaging mechanism, a vacuum operated servo motor including a piston rod, linkage mechanism operatively connecting said piston rod to said clutch disengaging mechanism, said servo motor being normally effective upon admission of vacuum thereto to move said piston rod and linkage mechanism through a normal range of motion to disengage said clutch, a source of vacuum, valve means for controlling the admission of vacuum to said servo motor, speed responsive means for controlling said valve means to connect said servo motor to said vacuum source to disconnect said clutch at speeds below a predetermined speed, additional manually operable means for controlling said valve means to connect said servo motor to said vacuum source to disengage said clutch at will at speeds above said predetermined speeds, a normally closed relief valve associated with said vacuum source, a manually operable override device operatively connected to said linkage and to said relief valve, said override device being effective when actuated to first open said relief valve to connect said vacuum source to atmosphere and to thereafter move said linkage beyond the normal disengagement position obtainable by operation of said servo motor to permit engagement of said clutch at speeds below said predetermined speed.

4. In a clutch control mechanism of the type having a rotatable casing, a clutch plate, a pressure plate, centrifugally operable means pivoted to said casing, a spring ring, a spring disposed between said pressure plate and said spring ring effective to bias said pressure plate toward engagement with said clutch plate and to bias said spring ring into contact with said centrifugally operable means, a stop member carried by said pressure plate and normally cooperating with said centrifugally operable means to prevent engagement of said pressure plate with said clutch plate when said casing is at rest, a clutch throwout bearing operably connected to said pressure plate, a vacuum operable servo motor, linkage connecting said servo motor to said throwout bearing, a source of vacuum, valve means for controlling the admission of vacuum to said servo motor, said servo motor being effective upon admission of vacuum thereto to move said pressure plate through a limited range of movement to release said clutch without releasing said stop member from said centrifugally operable means, a normally closed relief valve effective when open to connect said servo motor to atmosphere, and an additional manually operable control operatively connected to said relief valve and to said pressure plate, said last-mentioned control being effective when actuated to open said relief valve and to move said pressure plate beyond the range of travel obtainable through operation of said servo motor to release said stop member from said centrifugally operable means, said spring being effective upon release of said stop member from said centrifugally operable means to apply said pressure plate to said clutch plate when said rotatable casing is at rest.

5. In a clutch control mechanism of the type having a rotatable casing, a clutch plate, a pressure plate, centrifugally operable means carried by said casing, a spring ring, a spring disposed between said pressure plate and said spring ring effective to bias said pressure plate toward a clutch engaging position and said spring ring into engagement with said centrifugally operable means, a stop member carried by said pressure plate and normally cooperating with said centrifugally responsive means to prevent engagement of said clutch plate by said pressure plate when said casing is at rest, said centrifugally operable means being normally effective upon rotation of said casing at speeds above a predetermined speed to move said spring ring and pressure plate to engage said pressure plate to said clutch plate, a clutch throwout bearing operably connected to said pressure plate, a vacuum responsive servo motor, linkage connecting said servo motor to said clutch throwout bearing, a vacuum source connectable to said servo motor, valving for controlling the admission of vacuum to said servo motor, said servo motor being effective upon admission of vacuum thereto to move said pressure plate through a limited range of travel to release said pressure plate from said clutch plate without releasing said stop member from said centrifugally responsive means, a normally closed relief valve effective when opened to connect said servo motor to atmosphere, and an additional manually operable control connected to said relief valve and said pressure plate, said additional control being effective when actuated to open said relief valve and to move said pressure plate through a range of travel greater than that provided by said servo motor to release said stop member from said centrifugally operable means, said spring being effective upon release of said stop member to engage said pressure plate to said clutch plate when said rotatable casing is at rest.

6. In a clutch control mechanism of the type having a rotatable casing, a clutch plate, a pressure plate, centrifugally responsive means carried by said casing, a spring ring, a spring disposed between said spring ring and pressure plate, said spring being effective to bias said spring ring into engagement with said centrifugally responsive means and said pressure plate toward a clutch engaging position, a stop member carried by said pressure plate and cooperating with said centrifugally responsive means to normally prevent engagement of said pressure plate and said clutch plate when said casing is at rest, said centrifugally responsive means being effective when said casing is rotated at speeds above a predetermined speed to position said pressure plate to engage said clutch plate, a clutch throwout bearing operatively connected to said pressure plate, a vacuum responsive servo motor, linkage connecting said servo motor to said throwout bearing, a source of vacuum, valve means for controlling the admission of vacuum to said servo motor, said servo motor being effective upon admission of vacuum thereto to move said pressure plate through a limited range of travel to release said pressure plate from said clutch plate without releasing said stop member from said centrifugally responsive means, a normally closed relief valve effective when opened to connect said servo motor to atmosphere, and manually operable means operatively connected to said relief valve and to said linkage effective when actuated to first open said relief valve and to thereafter move said linkage beyond the normal range of travel obtainable by operation of said servo motor to release said stop member from said centrifugally responsive means, said manually operable means including a hollow conduit having one end thereof fixed to said relief valve and an inner cable connected to said linkage, said spring being effective upon release of said stop member to engage said pressure plate to said clutch when said rotatable casing is at rest.

7. In a clutch control mechanism of the type having a rotatable casing, a clutch plate, a pressure plate, centrifugally responsive means carried by said casing, a spring ring, a spring disposed between said spring ring and pressure plate, said spring being effective to bias said spring ring into engagement with said centrifugally responsive means and said pressure plate toward a clutch engaging position, a stop member carried by said pressure plate and cooperating with said centrifugally responsive means to normally prevent engagement of said pressure plate and said clutch plate when said casing is at rest, said centrifugally responsive means being effective when said casing is rotated at speeds above a predetermined speed to engage said pressure plate to said clutch plate, a clutch throwout bearing operatively connected to said pressure plate, a vacuum responsive servo motor having a piston rod comprising a hollow tube, a vacuum source, a chamber in said servo motor connectable to said vacuum source, valve means for connecting said chamber to said vacuum source, said hollow tube providing a connection to said chamber, a valve seat carried by said hollow tube, linkage mechanism for connecting said clutch throwout bearing to said hollow tube including a rod extending into said hollow tube, a valve member fixed to said rod and normally seated upon said valve seat, said servo motor being effective upon admission of vacuum to said chamber to move said pressure plate through a limited range of movement to release said pressure plate from said clutch plate without releasing said stop member from said centrifugally responsive means, and an additional manually operable control connected to said linkage effective when actuated to move said rod to unseat said valve to connect said chamber to atmosphere through said tube and to move said pressure plate beyond the normal range of travel provided by said motor to release said stop member from said centrifugally operable means, said spring being effective upon release of said stop member to apply said pressure plate to said clutch plate when said rotatable casing is at rest.

8. In a clutch control mechanism of the type having a rotatable casing, a clutch plate, a pressure plate, a bellcrank lever pivotally mounted on said casing and having outer and inner arms, a spring ring, a spring disposed between said spring ring and said pressure plate, a weight on said outer arm, said spring being effective to bias said pressure plate toward said clutch plate, a stop member carried by said pressure plate and cooperating with said bellcrank lever to prevent said pressure plate from contacting said clutch plate when said casing is rotated at speeds below a predetermined speed, said weight being effective when said casing is rotated at speeds above said predetermined speed to move said spring ring to engage said pressure plate to said clutch plate, a clutch throwout bearing operatively connected to said pressure plate, a vacuum operable servo motor, linkage connecting said servo motor to said throwout bearing, a vacuum source, valve means for controlling the admission of vacuum to said servo motor, said servo motor being effective upon admission of vacuum thereto to move said pressure plate through a limited range of travel to release said pressure plate from said clutch plate without releasing said stop member from said bellcrank lever, a normally closed vacuum relief valve, and an additional manually operable control operably connected to said relief valve and to said linkage, said last-mentioned control being effective when actuated to open said relief valve and to move said pressure plate beyond the range of travel obtainable by operation of said servo motor to release said stop member from said bellcrank lever, said spring being effective upon release of said stop member to engage said pressure plate to said clutch plate when said casing is at rest.

9. In a clutch control mechanism of the type having a rotatable casing, a clutch member, a pressure plate adapted to alternately engage and be released from said clutch member, a bellcrank lever pivoted to said casing and having outer and inner arms, a weight carried by said outer arm, an opening through said inner arm, a pillar pivotally supported on said pressure plate and extending through said opening, a movable spring ring, a spring positioned between said pressure plate and said spring ring and biasing said spring ring into contact with said inner arm and said pressure plate toward said clutch member, a stop member on said pillar normally contacting said inner arm on the side of said inner arm opposite from said spring ring to prevent engagement of said pressure plate with said clutch member when said casing is at rest, said weight being normally effective when said casing is rotated at speeds above a predetermined speed to move said inner arm to enable said spring to position said pressure plate into contact with said clutch member, a clutch release bearing operatively connected to said pressure plate, a vacuum responsive servo motor, linkage connecting said servo motor to said clutch release bearing, a vacuum source, control valving for alternately connecting said servo motor to said vacuum source and to atmosphere, said servo motor being effective upon admission of vacuum thereto to move said pressure plate through a limited range of motion to release said clutch member, a normally closed relief valve adapted when open to connect said servo motor to atmosphere, and a manually operable control operatively connected to said relief valve and to said linkage, an additional spring carried by said pressure plate yieldably biasing said pillar toward a position wherein said stop member is positioned in alignment with said opening, said manually operable control being effective when actuated to first open said relief valve and to thereafter move said clutch release bearing to a position beyond that obtainable through normal operation of said servo motor, said additional spring being effective when said clutch release bearing is moved beyond that obtainable through operation of said servo motor to place said stop member in alignment with said opening to permit said first-mentioned spring to apply said pressure plate to said clutch member when said casing is at rest.

10. In a clutch control mechanism of the type having a rotatable casing, a clutch member, a pressure plate movable to engage said clutch member, a bellcrank lever pivoted to said casing and having outer and inner arms, a weight carried by said outer arm, an opening through said inner arm, a pillar pivotally supported on said pressure plate and extending through said opening, a spring ring disposed between said pressure plate and said inner arm, a first spring seated upon said pressure plate and said spring ring, said spring ring having a portion thereof in contact with said inner arm, a stop member on said pillar normally contacting said inner arm on the side of said inner arm opposite from said spring ring, said weight member being normally effective when said casing is rotated at a speed above said predetermined speed to position said inner arm, spring ring and pressure plate to engage said clutch, said stop member being normally effective when said casing is rotated at a speed below said predetermined speed to prevent engagement of said clutch, a clutch throwout bearing operatively connected to said pressure plate, a vacuum operable servo motor, linkage operatively connecting said servo motor to said clutch throwout bearing, a vacuum source connectable to said servo motor, valve means for controlling the admission of vacuum to said servo motor, said servo motor being effective upon admission of vacuum thereto to move said pressure plate toward said spring ring through a limited range of motion, a normally closed relief valve effective when opened to connect said servo motor to atmosphere, an additional manually operable control operatively connected to said relief valve and to said linkage, said additional control being effective when actuated to first open said relief valve and to thereafter move said pressure plate toward said spring ring further than the normal range of motion obtainable by operation of said servo motor, means effective when said pressure plate is positioned in said last-mentioned position and said rotatable casing is at rest to position said stop member in alignment with said opening in said inner arm, said spring being effective upon release of said additional manually operable control to engage said pressure plate to said clutch member.

11. In a clutch control mechanism of the type having a rotatable casing, a clutch plate adapted to be engaged by a pressure plate, a bellcrank lever pivoted to said casing and having outer and inner arms, a weight carried by said outer arm, an opening through said inner arm, a pillar pivotally supported on said pressure plate and extending through said opening, a spring ring disposed between said pressure plate and said inner arm, a clutch engaging spring seated upon said spring ring and said pressure plate for biasing said pressure plate into engagement with said clutch plate, said spring ring having an extension contacting said inner arm, said pillar having a stop member thereon for contacting said inner arm on the side thereof opposite from said spring ring extension, said weight being normally effective when said casing is rotated at a speed above a predetermined vehicle speed to move said inner arm and said spring ring toward said pressure plate to engage pressure plate to said clutch plate, a clutch throwout bearing operatively connected to said pressure plate, a vacuum responsive servo motor, linkage mechanism operatively connecting said servo motor to said clutch throwout bearing, a vacuum source, valve means for connecting said servo motor to said source of vacuum or to atmosphere, said vacuum motor being normally operable to move said clutch throwout bearing through a limited range of movement to disengage said clutch upon admission of vacuum thereto, an additional control selectively operable at will to first connect said servo motor to atmosphere and thereafter move said throwout bearing beyond the normal range of movement of said bearing by said vacuum motor, spring means effective when said throwout bearing is in said last-mentioned position to align said stop member with said opening in said inner arm of said bellcrank lever, said clutch engaging spring being effective when said additional control is released to move said pressure plate to engage said clutch.

References Cited in the file of this patent
UNITED STATES PATENTS

| | | |
|---|---|---|
| 1,862,718 | Spiller | June 14, 1932 |
| 2,018,101 | Swennes et al. | Oct. 22, 1935 |
| 2,058,313 | Hill | Oct. 20, 1936 |
| 2,075,211 | Lewis | Mar. 30, 1937 |
| 2,511,373 | Price | June 13, 1950 |
| 2,520,721 | Hupp | Aug. 29, 1950 |
| 2,551,918 | Wickwire et al. | May 8, 1951 |

FOREIGN PATENTS

| | | |
|---|---|---|
| 427,649 | Great Britain | Apr. 29, 1935 |
| 732,252 | Great Britain | June 22, 1955 |